US005732383A

United States Patent [19]

Foladare et al.

[11] Patent Number: 5,732,383

[45] Date of Patent: Mar. 24, 1998

[54] TRAFFIC INFORMATION ESTIMATION AND REPORTING SYSTEM

[75] Inventors: Mark Jeffrey Foladare, Kendall Park; Shelley B. Goldman, East Brunswick; Kin K. Leung, Edison; Yzhak Ronen, West Windsor; Gabriel Gary Schlanger, West Orange; David Phillip Silverman, Somerville, all of N.J.

[73] Assignee: AT&T Corp, Middletown, N.J.

[21] Appl. No.: 528,292

[22] Filed: Sep. 14, 1995

[51] Int. Cl.⁶ .............................. H04Q 7/20; G06F 19/00

[52] U.S. Cl. .............................. 701/117; 701/118; 379/59

[58] Field of Search .............................. 364/436, 437, 364/438, 460; 379/58, 59; 455/33.1

[56] References Cited

U.S. PATENT DOCUMENTS

| | | | |
|---|---|---|---|
| 5,095,532 | 3/1992 | Mardus | 455/186 |
| 5,131,020 | 7/1992 | Liebesny et al. | 379/59 |
| 5,155,689 | 10/1992 | Wortham | 364/460 |
| 5,177,685 | 1/1993 | Davis et al. | 364/443 |
| 5,182,555 | 1/1993 | Sumner | 340/905 |
| 5,402,117 | 3/1995 | Zijderhand | 340/905 |
| 5,420,794 | 5/1995 | James | 364/436 |
| 5,465,289 | 11/1995 | Kennedy, Jr. | 379/59 |
| 5,539,645 | 7/1996 | Mandhyan et al. | 364/438 |
| 5,572,450 | 11/1996 | Worthy | 364/571.02 |

OTHER PUBLICATIONS

W.R. Young, "Advanced Mobile Phone Service: Introduction, Background, and Objectives," The Bell System Technical Journal, vol. 58, No. 1, Jan. 1979, pp. 1–14.

Talmage P. Bursh, Jr. et al., "Digital Radio for Mobile Applications," AT&T Technical Journal, vol. 72, No. 4, Jul./Aug. 1993, pp. 19–26.

*Primary Examiner*—Michael Zanelli

[57] ABSTRACT

An estimation of traffic conditions on roads located in the radio coverage areas of a wireless communications network is provided based on an analysis of real-time and past wireless traffic data carried on the wireless communications network. Data analyzed may include, for example, actual (current) and expected (past average) number of a) active-busy wireless end-user devices in one or more cells at a particular period of time, b) active-idle wireless end-user devices registered in a location area of the wireless communications network, c) amount of time spent by mobile end-user devices in one or more cells at a particular period of time.

20 Claims, 5 Drawing Sheets

20
30
71
80
LAND-LINE NETWORK
60
VOICE INFORMATION SYSTEM
MCS
REGISTRATION COUNTER
CELL COUNTER
REGISTRATION TIMER COMPLEX
CELL TIMER COMPLEX
GENERAL STORAGE AREA
CPU
52
104
105
102
100
103
106
101
53
55
50
WIRELESS NETWORK
93
92
90
91
1
2
3
4
5
6
7
8
9
10
11
12

FIG. 2

| CELLS | THOROUGHFARES | REFERENCE POINTS | ALTERNATE ROUTES | ADJACENT CELLS |
|---|---|---|---|---|
| CELL 3 | HIGHWAY NO.1 | TOWN A<br>TOWN B | HIGHWAY 6<br>ROAD 9 | 2,1 |
| CELL 7 | MAIN ST | SMITH ST<br>JONES ST | HIGHWAY 33 | 11,12 |
| CELL 25 | MEMORIAL PARKWAY | EXIT 5<br>EXIT 7 | EXPRESS FREEWAY | 20,23 |
| CELL 38 | EASTERN TURNPIKE | EXIT 90<br>EXIT 93 | ROUTE 21 | 35,33 |
| ⋮ | ⋮ | ⋮ | ⋮ | ⋮ |
| CELL 59 | US HIGHWAY NO. 130 | BELAIR RD<br>MAPLE AVE | KINGS BLVD | 55<br>58 |

TRAFFIC INFORMATION ESTIMATION AND REPORTING SYSTEM

TECHNICAL FIELD

This invention relates to communications systems and more particularly to a method and a system for estimating and delivering road condition information to communications services users.

BACKGROUND OF THE INVENTION

Recent developments in satellite systems technology, such as Low Earth Orbit (LEO) satellites and Very Small Aperture Terminals (VSAT), have provided the impetus for the creation of a wide variety of mobile communications services. These services include personal satellite telephone services and global positioning service (GPS). Prominent among the services provided under the umbrella of global positioning are real-time locator and navigation services for automobile drivers and pedestrians, not to mention security- and military-related applications. The real-time locator service identifies the relative position of a device within a few feet of the real coordinates of the device. By contrast, the navigation service provides directions to an end-user (in the form of digital maps, for example) based on a user's position as well as traffic congestion with respect to that position. Unfortunately, market acceptance of global positioning service has been slower than anticipated by the GPS planners and designers. This is primarily because global positioning service providers have to spread the high cost of procuring and launching (LEO) satellites over a small customer base.

In an attempt to offer similar services at a lower price, systems designers have developed a surface transportation monitoring system called "Intelligent Vehicle Highway System" (IVHS). That system uses video-based detection devices and road sensors to collect real-time traffic data and to deliver warning and alternate route information to users when traffic congestion occurs. The infrastructure for the Intelligent Vehicle Highway System is probably less costly than the infrastructure of the Global Positioning System, which would lead to an expectation of lower cost for IVHS-based service. Sadly, IVHS developers have found out that because IVHS service is limited to congestion detection/management and traffic reporting, the IVHS customer base may even be smaller than the one for GPS. Hence, the smaller IVHS customer base may operate to vitiate any competitive advantage IVHS may enjoy over GPS. This issue is further complicated by the fact that major radio stations broadcast periodic traffic condition reports targeted at drivers on major metropolitan highways. Thus, it is unlikely that radio listeners on the road would pay for a service that is available to them practically free-of-charge, unless the service includes features heretofore unavailable. The radio stations typically receive the traffic report information that they broadcast from sources such as reporters on board strategically located helicopters. Alas, the radio-broadcast traffic information reporting service is delivered primarily during rush hours, and is targeted primarily to listeners on major highways. The delivery time and scope of the radio-broadcast information operate to make that information worthless to drivers who are traveling either during non-rush hours, or on a congested secondary highway or a suburban road. In addition, the radio-broadcast traffic information reporting service does not offer detailed alternate paths to allow targeted drivers/listeners to avoid the congested area. Furthermore, the radio-broadcast traffic information "ages" rapidly (typically, far more rapidly than the radio-broadcast report frequency) as new accidents occur and old ones no longer hamper road traffic. Thus, a problem of the prior art is lack of an "anytime, anywhere" solution that allows delivery of road congestion information to users without deploying a new costly information collection infrastructure.

SUMMARY OF THE INVENTION

The present invention is directed to a system which estimates traffic conditions in the thoroughfares located in one or more radio coverage areas of a wireless communications network based on an analysis of real-time and past traffic information carried on, and collected by, the wireless communications network. The data collection process is performed as part of the registration operation and hand-off procedure carried out by the wireless communications network. Data analyzed may include, for example, actual (current) and expected (past average) number of a) active-busy wireless end-user devices in one or more cells at a particular period of time, and b) active-idle wireless end-user devices registered in a location area of the wireless communications network.

In an embodiment of the principles of the invention, an inference of traffic congestion is made when the number of wireless end-user devices active in a cell or location area exceeds a given threshold. For example, the ratio of actual to expected registered number of wireless devices that are active-busy in a cell and/or active- idle in a location area may be indicative of a bottleneck in one or more major roads located in that cell or in that location area. Furthermore, the same ratio in adjacent cells or location areas provides orientation information regarding bottlenecks on that road. For example, when a cell A and its adjacent cell B to the north are experiencing higher than expected communications traffic while adjacent cell C that is located to the south of A is experiencing communications traffic level equal to or lower than an expected level, an inference is made that a bottleneck is present in the northbound section of the highway or the major road located in cell A. The inference of road traffic congestion based on higher than expected traffic level in particular coverage areas of a wireless network is supported by empirical studies which tend to indicate a direct correlation between traffic jams on a road and increased wireless network traffic in a cell where the congested section of that road is located. The expected traffic level for a cell is derived from past historical data collected by a wireless communications network. The expected traffic level also takes into consideration time-dependent factors, such as time-of-day, day-of-week, day-of-year. Other variables factored in the determination of the threshold level include scheduled events, such as parades and road repairs.

In another embodiment of the invention, an inference of traffic congestion on a road within the coverage area of a cell or location area is made when a significant number of wireless devices spend higher than expected amount of time to traverse that cell or location area. The expected amount of time for a wireless device to traverse a cell is based on past historical data which factors therein time-dependent parameters, such as time-of-day, day-of-week and day-of-year.

According to one aspect of the invention, a user may subscribe to the on-demand traffic reporting service which allows the user to be alerted of possible congestion on any road of an itinerary provided by the user. The itinerary may list, for example, different cells in which the subscriber is expected to travel within particular time intervals.

According to another aspect of the invention, a subscriber may receive unsolicited traffic reports of road congestion and alternate routing information whenever the current cell (location area) in which the subscriber is located and/or cells (location areas) adjacent to that current cell (location area) are experiencing higher than expected wireless traffic.

BRIEF DESCRIPTION OF THE DRAWINGS

In the drawings:

FIG. 2 illustrates a table that maps particular cells or location areas to sections of a thoroughfare;

DETAILED DESCRIPTION

Figure 1:
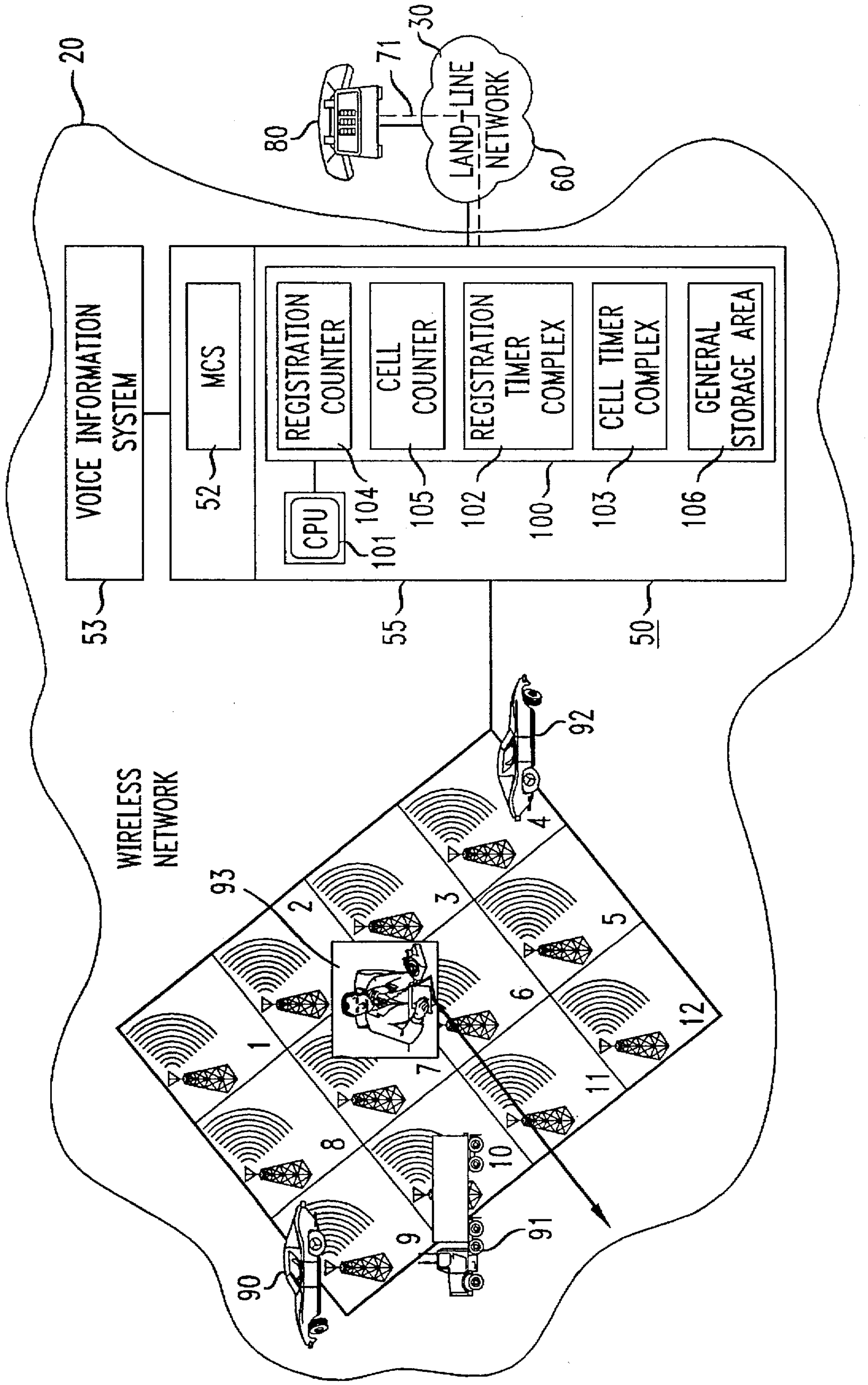
FIG. 1 shows in block diagram format a communications switching system arranged in accordance with the invention to estimate traffic conditions in the thoroughfares located in the radio coverage area of the wireless component of the communications switching system.

Shown in the block diagram of FIG. 1 is a communications switching system that includes a wireless network 20 and a land-line network 30. The land-line network 30 is comprised of interconnected local, tandem and toll switches (not shown) that enable a telephone call to be completed to a wired telephone set (such as set 80) or to be forwarded to wireless network 20. The latter includes modular software and hardware components designed to provide radio channels for communications between mobile end-user devices and other devices connected to the communications switching system of FIG. 1. Wireless network 20 may be an analog communications system using, for example, the Advanced Mobile Phone Service (AMPS) analog cellular radio standard. A detailed description of an AMPS-based communications system is provided in *Bell System Technical Journal*, Vol. 58, No. 1, January 1979, pp. 1–14. Alternatively, wireless network 20 may be a digital communications system implementing well-known code division multiple access (CDMA) or time-division multiple access (TDMA) techniques. Additional information on TDMA and CDMA access techniques can be found in *AT&T Technical Journal*, Vol. 72, No. 4, July/August 1993, pp. 19–26.

The wireless network 20 is comprised of a number of base stations 1 to 12, each one of which includes a transceiver, an antenna complex (antenna and tower), and a controller that are arranged to wirelessly communicate with mobile end-user devices 90–93 when they are located in the radio coverage area of one of the base stations. That radio coverage area is referred to in the art as a "cell" for cellular networks and "microcells" for personal Communications Network (PCN). As the points of access and egress for signals transmitted to, and received from, wireless network 20, base stations 1–12 perform certain call setup functions that include initial channel assignment and supervision of the wireless link establishment.

At the heart of wireless network 20 is wireless switch 50 that monitors and coordinates the operations of the base stations 1–12. It includes a processor 55 (whose functions are described below) and a Mobile Switching Center (MSC) 52 which provides seamless communications paths for calls (that span the wireless network 20 and the land-lines network 30) by "bridging" radio channels (from wireless network 20) with "wire" channels (from land-line communications network 30).

Of particular importance among the components of wireless switch 50 is processor 55 that executes some of the call processing instructions shown in FIGS. 3, 4, 5 described below. The processor 55 includes a CPU 101 and a storage area 100. CPU 101 coordinates some of the call processing functions performed by base stations 1–12. Storage area 100 contains, in addition to the processing instructions illustrated in FIGS. 3–5 (contained in general storage area 106), registration and cell counters 104 and 105 and registration and cell timer complexes 102 and 103. The counters and timers may be implemented, for example, as a series of EEPROMs which store the individual values of the counters for each cell and the individual values of the timers for each mobile end-user device in an active-busy state. Other functions performed by CPU 101 include the registration procedure and hand-off operations that allow wireless network 20 to identify, validate and track the location of wireless end-user devices 90–93 within specific radio coverage areas as these devices move within the geographical area covered by the wireless network.

A well-known registration procedure is the Home Location Register and Visitor Location Register (HLR/VLR) method. In the HLR/VLR method, a location area is assigned to a collection of cells, such as base stations 1–12. According to the HLR/VLR method, an active-idle mobile (i.e., a device that is energized but that is not emitting or receiving speech or data signals) needs to register at the time the device is energized or when the device enters a new location area. Hence, when wireless switch 50 needs to complete a call to one of the mobile devices 90–93, it broadcasts a paging signal only to the cells associated with the location area where the mobile device is registered. When one of the mobile end-user devices 90–93 registers, CPU 101 of wireless switch 50 increments an appropriate counter in registration counter 104 by "one" and starts an appropriate timer in the registration timer complex 102. Conversely, when a mobile device is powered off or exits a location area, the processor 55 of wireless switch 50 decrements the registration counter by "one" and sends a signal to the registration complex 102 to cause the timer associated with that device to reset.

The hand-off operations are performed by CPU 101 in cooperation with base stations 1–12. Each one of the base stations 1–12 is arranged to measure and assess the strength of signals received from an active-busy mobile device. Hence, as a mobile end-user device crosses the boundary of one of the base stations 1–12 to enter another one of these base stations, the diminished strength of the signal received by the exiting cell impels CPU 101 of wireless switch 50 to initiate the hand-off procedure which assigns a radio channel from the new base station for communications with the mobile end-user device. Processor 55 is arranged to increment by "one" a cell counter for a cell whenever one of the mobile end-user devices 90–93 initiates a call from a location within the coverage area of that cell. CPU 101 also increments by "one" the appropriate counter in cell counter 105 when one of the mobile end-user devices 90–93 (in an active-busy state) enters the radio coverage area of that cell. In that case, CPU 101 also records the cell number of the previous cell to identify the direction being traveled by the user of the mobile end-user device. The mobile end-user devices 90–93 may be cellular telephone sets, two-way pagers, multimedia wireless devices or even low-mobility portable communications devices when wireless network 20 is a personal Communications Network (PCN).

As mentioned above, processor 55 also includes a registration timer complex 102 and a cell timer complex 103 which are comprised of a series of EEPROMs with clocks that are that are associated with particular mobile end-user device in specific situations. For example, CPU 101 starts a timer for one of mobile end-user devices 90–93 when that device registers. Similarly, when one of mobile end-user devices 90–93 initiates a call or enters a new cell, CPU 101 starts a timer for that device. Both types of timers are designed to reset upon receiving a particular type of signal from CPU 101. That signal is emitted by CPU 101 to a) a registration timer when a user powers off an energized mobile end-user device, and b) to a cell timer when an active-busy mobile end-user device leaves a cell or is turned off. Even though the cell timer complex 103 is shown as part of the wireless switch 50, it is to be understood that it may be implemented as a stand-alone device or may be alternatively included in a processor of each of the base stations 1–12. Cell timer 103 is arranged to forward a signal to CPU 101 when a timer has exceeded a particular threshold. The value associated with that threshold is based on past average period of time for a driver, for example, to traverse that cell under similar conditions, such as same time-of-day, same day-of the-week and same day-of-the-year. This past average period of time that is hereinafter referred to as "past average analog equivalent amount of time" is forwarded periodically by CPU 101 to cell timer complex 103.

Connected to wireless switch 50 is a Voice Information System (VIS) 53 that is arranged to a) initiate calls to mobile end-user devices 90–93 when a particular event occurs, b) receive calls and prompt callers for specific information by asking questions based on a set of modules in a transaction script, c) collect information from a caller in the form of speech input or Dual Tone Multi Frequency, and d) forward collected information to processor 55.

In addition to the registration and cell counters, processor 55 also stores the table of FIG. 2 which correlates particular cells (shown in the leftmost column) to sections of a thoroughfare (depicted in the second leftmost column). Although the table of FIG. 2 shows only one major thoroughfare per cell, it is to be understood that more than one major thoroughfare may be served by one cell. In that latter case, the strength of the signal received by one of the base stations 1–12 may be used to distinguish which mobile end-user devices are traveling on which thoroughfare. Of course, when a cell serves more than one major thoroughfare, each one of those thoroughfares has its own reference points, alternate routing information and adjacent cells entry in the table of FIG. 2.

The table of FIG. 2 also includes reference points (shown as the middle column of FIG. 2) which identify the general boundaries of a section of a thoroughfare served by a particular cell. The reference points may be well-known streets, or exit numbers of a highway. Illustrated in the rightmost column of FIG. 2 are adjacent cells whose function in the road bottleneck identification and estimation process is described in detail below. Suffice to say for now that those adjacent cells are oriented in the same direction as the cell serving a particular section of the thoroughfare. By way of example, if highway 1 (shown in the top row of FIG. 2) is oriented in the north-south direction, adjacent cells 2 and 1 are cells that are located to the north and south, respectively, of cell 3. The table of FIG. 2 also includes alternate routing information that represents other thoroughfares oriented in the same direction as the section of a thoroughfare served by a particular cell. Optionally, the alternate route information may be implemented, for example, as pointers to stored digital maps associated with the geographical area served by a particular cell.

Figure 3:
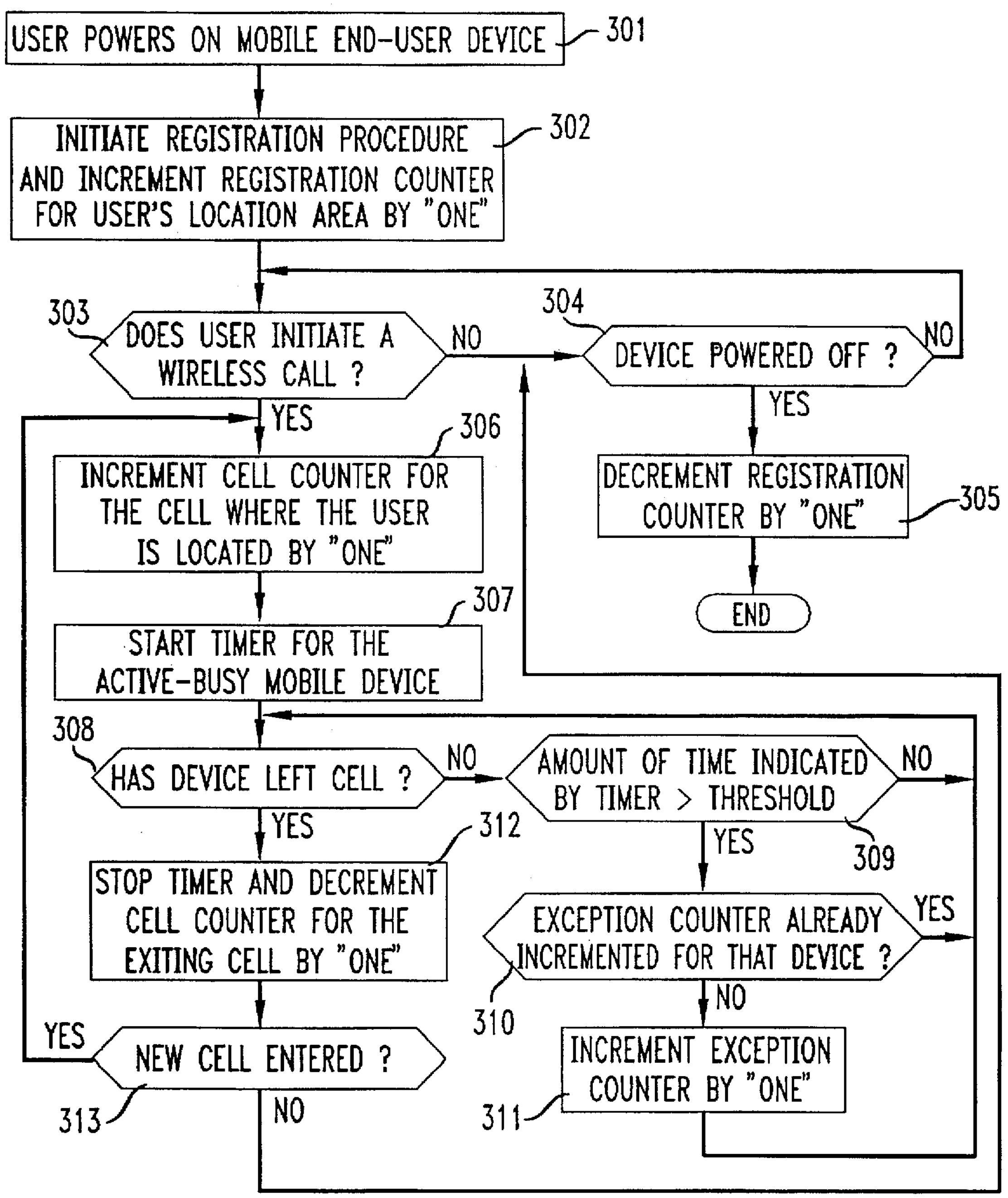
FIG. 3 presents in flow diagram format illustrative instructions executed by a processor in the network of FIG. 1 to collect information on wireless end-user devices located within the radio coverage area of the wireless component of the communications switching system.

FIG. 3 is a flow diagram of illustrative instructions executed by some of the components of the communications switching system of FIG. 1 to collect information on wireless end-user devices located within the radio coverage area of the wireless network of FIG. 1. The information collection process contemplated by the invention is initiated in step 301 when a user turns on one of the mobile end-user devices 90–93. This triggers the registration procedure, in step 302, which causes CPU 101 to increment by "one" the appropriate counter in registration counter 104 for the location area of the device. If the user initiates a call, as determined in step 303, CPU 101 proceeds, in step 306, to increment by "one" a counter in cell counter 105, and to start a timer in the cell timer complex 103 in step 307. If the user does not initiate a call, a determination is then made, in step 304, as to whether the energized device has been powered off. If so, the registration counter is decremented by "one" to end the information collection process.

After a call has been initiated (as determined in step 303), the appropriate counter in the cell counter incremented (as shown in step 306) and the timer started (as indicated in step 307), the call is monitored by CPU 101 to determine in step 308 whether the device has left the cell. If so, CPU 101, in step 312, sends a signal to cell timer complex 103 to stop the timer for the device, and to decrement by "one" the counter for the cell exited by the device. Thereafter, a determination is made in step 313 as to whether the device has entered a new cell. If so, steps 306 through 308 are repeated. Otherwise, steps 304 and 305 (as needed) are performed. When it is determined, in step 308, that the device has not left the cell, CPU 101 performs a test in step 309 to ascertain whether the amount of time indicated by the timer exceeds a pre-determined threshold represented by the past average analog equivalent amount of time for devices in that cell. When the result of that test is negative, step 308 and other subsequent steps are performed as needed. If the result of the test is positive, CPU 101 performs a second test to determine whether the exception counter has already been incremented for the device in question. If so, step 308 and other subsequent steps are performed as needed. Otherwise, an exception counter is incremented by one in step 310, and step 308 is repeated.

One of the road traffic estimation and delivery processes of the invention is initiated in step 401, when CPU 101 compares the value indicated by the cell counter for a particular cell (called "cell count A") to the expected average number of active-busy devices (B) in that cell under equivalent analog conditions, such as time-of-day, day-of-week, day-of-year. CPU 101 determines in step 402 whether the value of the cell counter A exceeds the expected average B by more than 25%. It should be noted that this percentage value is provided for illustrative and pedagogical purposes only and therefore do not limit the scope of the invention. If the value of the cell counter A exceeds the expected average B by more than 25%, CPU 101 retrieves the cell profile in step 403 and identifies the direction of a potential traffic jam in step 404. This is done by comparing the value of the cell counter in each of the adjacent cells (indicated by the cell profile) to the respective expected analog equivalent average of each adjacent cell. The adjacent cells in question are located in the same general direction in which traffic flows in the thoroughfare. Hence, if traffic on a road flows in the north-south direction, and the adjacent cell to the north of the cell of interest is experiencing higher than the analog equivalent average traffic level, while the adjacent cell to the south of the cell of interest is experiencing wireless traffic level lower than or equal to the analog equivalent average wireless traffic level, a conclusion is reached that the potential traffic jam on the section of the road is in the northbound direction.

If it is determined in step 405 that the value of the cell counter exceeds the expected average by more than an illustrative value of 50%, in step 406 a message that is indicative of presence of bottlenecks in the section of the thoroughfare (associated with the cell profile) is delivered to subscribers in that cell and other affected adjacent cell(s). If, however, it is determined in step 405 that the cell count is less than 50%, then a warning message that is indicative of the presence of a potential bottleneck in the section of the thoroughfare (associated with the cell profile) is delivered in step 407 to subscribers in that cell and other affected adjacent cell(s). The format in which those messages may be delivered is described below.

It is worth noting that in some instances the registration counter may be used as well to estimate road traffic conditions. For example, when the location area covers a geographical area that can be associated with a section of a thoroughfare, the number of active-idle mobile devices registered in that location area may be used to estimate road traffic conditions on that section of the thoroughfare. Alternatively, when a wireless network implements a registration scheme that requires mobile devices to register at the cell level, as opposed to location area level, the technique described in conjunction with FIG. 4 could also be used.

A second road traffic estimation and delivery process of the invention is initiated in step 501 when CPU 101 compares the value of the exception counter C to the cell count A. When the exception counter has a value that is more than 25% of the value of the cell counter, as determined in step 502, CPU 101, in step 503, retrieves the cell profile table of FIG. 2. Thereafter, CPU 101, in step 504, identifies the direction of a potential traffic jam using the techniques described earlier. If the value of the exception counter is over haft the value of the exception counter, as determined in step 505, then a message that is indicative of presence of bottlenecks in the section of the thoroughfare (indicated by the cell profile) is delivered to subscribers in that cell and other affected adjacent cell(s). If however, it is determined in step 505 that the cell count is less than 50%, then in step 507 a warning message that is indicative of the presence of a potential bottleneck in the section of the thoroughfare (associated with the cell profile) is delivered to subscribers in that cell and other affected adjacent cell(s).

The aforementioned messages may be delivered in audible format via a call initiated by Voice Information System 53 to a subscriber. The message may also include alternate routing information (associated with the cell) to allow the subscriber to avoid the congested section of the thoroughfare. When the mobile end-user device is a wireless data terminal, the message may be delivered in graphical format in the form of a digital map indicating the location of the bottleneck and directions to other less congested roads. When call waiting features are available for the mobile end-user devices 90–93, an appropriate road condition message may be delivered to a subscriber even when the mobile end-user device of the subscriber is in an active-busy state. Similarly, when the mobile end-user device has simultaneous voice data capability, a digital map can be delivered to a monitor connected to the mobile end-user device even when the device is in an active-busy state.

It should be noted that the values of the exception counter that trigger the road traffic estimation and message delivery process are provided for illustrative and pedagogical purposes and therefore do not limit the scope of the invention when other values are used.

Figure 4:
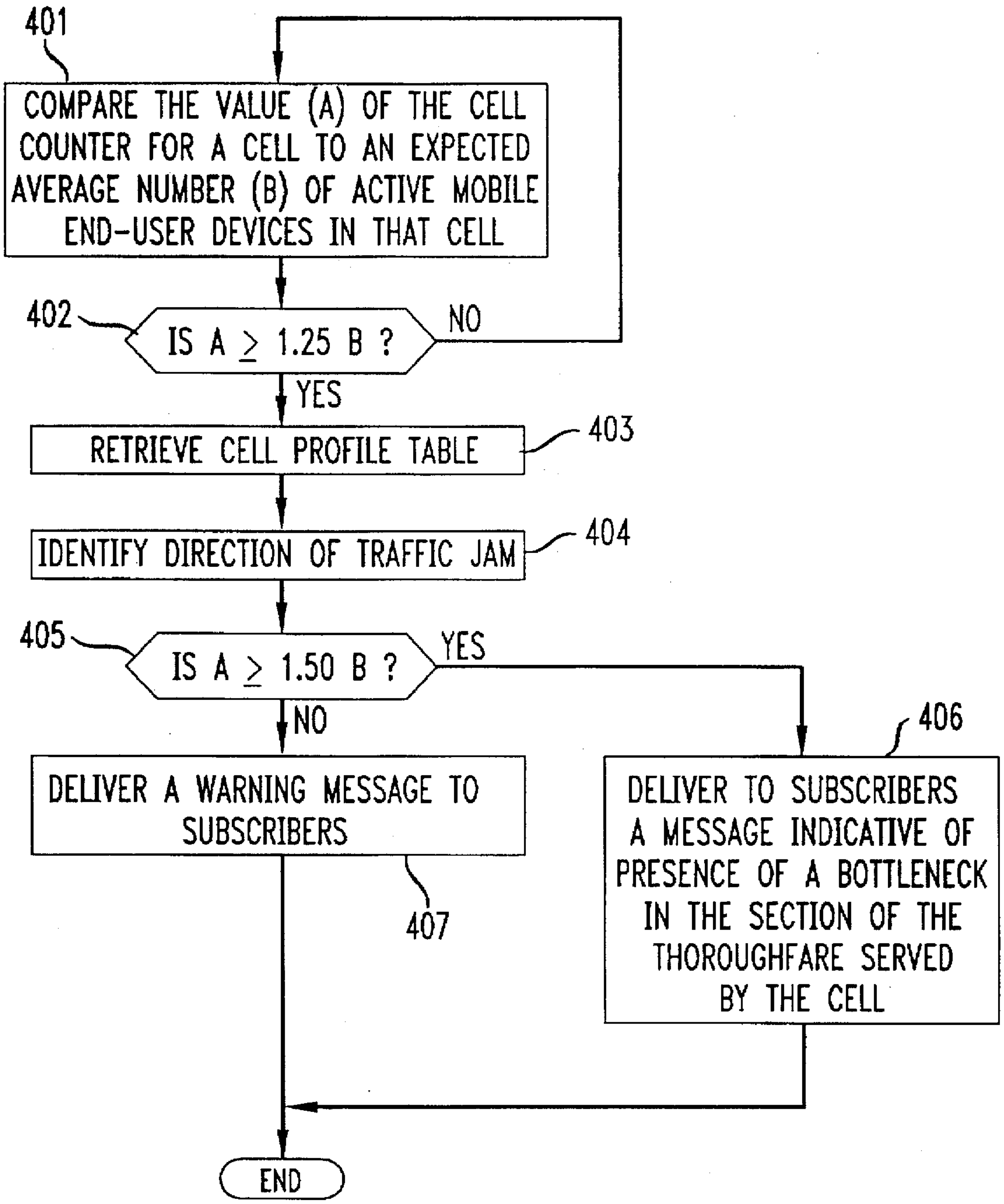
FIGS. 4 and 5 present in flow diagram format instructions executed by different components of the network of FIG. 1 to deliver traffic information to a subscriber in accordance with the invention.
Figure 5:
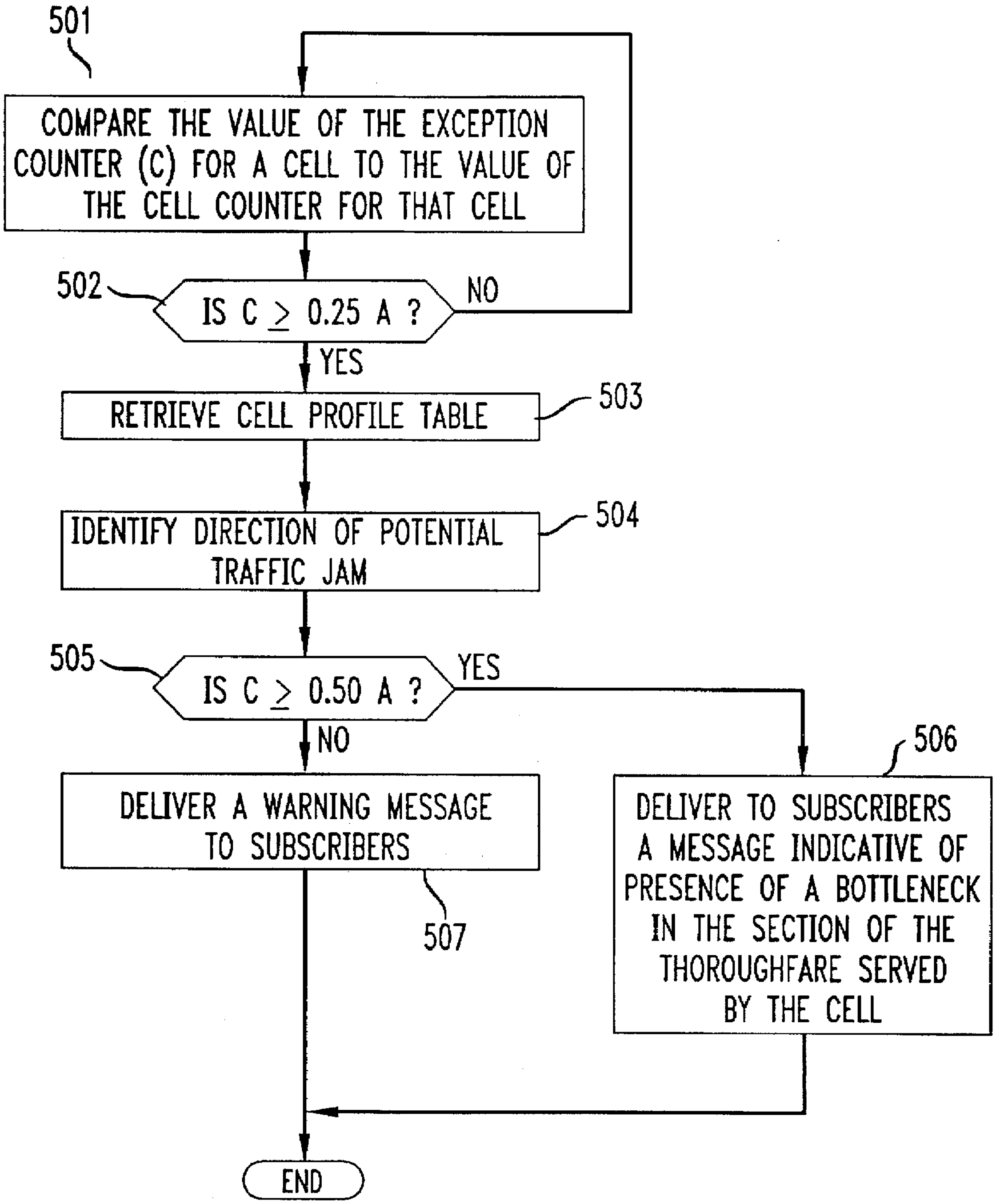

It is also worth noting that a combination of the techniques described in conjunction of FIGS. 4 and 5 could be used to implement the principles of the invention. For example, a message indicative of presence of bottleneck in a section of a thoroughfare (associated with a cell profile) could be delivered to subscribers in that cell when both conditions of a two-prong test are satisfied. The first condition may require, for example, that a certain number of active-busy devices in a cell exceed the past average analog amount of time spent in that cell while the second condition may dictate that the number of active-busy devices in a cell exceed the expected average (analog equivalent) number of active-busy devices by a certain percentage value.

According to one aspect of the invention, users may subscribe to the road traffic estimation and delivery service of the invention by pre-registering for the service. Hence, when a bottleneck occurs on a road that is associated in a cell where the mobile end-user device of the subscriber is active, Voice Information System 53 delivers one of the messages described above to the subscriber. Alternatively, the user may provide an itinerary by speech input or DTMF signal to Voice Information Service 53 which delivers appropriate messages (received from CPU 101) to the subscriber whenever congestion occurs in sections of the road associated with that itinerary.

The foregoing is to be, construed as only being illustrative embodiments of this invention. Persons skilled in the art can easily conceive of alternative arrangements providing functionality similar to this embodiment without any deviation from the fundamental principles or the scope of this invention.

We claim:

1. A method of determining road traffic conditions in thoroughfares located in radio coverage areas served by a wireless communications network including a plurality of base stations, each serving a cell in the radio coverage areas and a wireless switch coupled to the plurality of base stations, said method comprising the steps of:

receiving from each of a plurality of cells, via said wireless switch coupled to a base station associated with the cell, real-time registration and cell activity data from active mobile end-user devices currently located in each of said plurality of cells served by the wireless communications network; and estimating road traffic conditions in at least one thoroughfare located in said at least one of said radio coverage areas based on a comparison of said real-time registration and cells' activity data to past analog equivalent information previously collected by said wireless communications network for said at least one of said radio coverage areas.

2. The method of claim 1 wherein information associated with said estimated road traffic conditions is delivered to at least one user of one of said mobile end-user devices.

3. The method of claim 2 wherein said information associated with said estimated road traffic conditions is delivered in audible format to said at least one user of one of said mobile end-user devices.

4. The method of claim 2 wherein said information associated with said estimated road traffic conditions is delivered in graphical format to said at least one user of one of said mobile end-user devices.

5. The method of claim 2 wherein said information associated with said estimated road traffic conditions is delivered to said at least one user of one of said mobile end-user devices when said one of said mobile end-user devices is in an active-busy state.

6. The method of claim 1 wherein said estimating step further includes the steps of:

tallying at least a portion of said real-time registration and cells' activity data to determine a total number of mobile end-user devices that are active in at least one of said radio coverage areas within a given time period; and determining whether said total number of active mobile end-user devices in said at least one of said radio coverage areas exceeds a first threshold indicated by said past analog information for said at least one cell.

7. The method of claim 6 further comprising the step of:

establishing that a bottleneck is present in at least one section of at least one of said thoroughfares located in said at least one of said radio coverage areas when said total number of active mobile end-user devices in said at least one of said radio coverage areas exceeds said first threshold by a given percentage.

8. The method of claim 1 wherein said cells' activity data include amount of time spent by at least one active mobile end-user device in at least one cell.

9. The method of claim 8 further comprising the steps of:

counting a total number of said active mobile end-user devices that individually spend in said at least one cell an amount of time that exceeds a second threshold indicated by said past analog equivalent information for said at least one cell; and ascertaining that a bottleneck is present in at least one section of at least one thoroughfare associated with said at least one cell if said total number is higher than a given percentage of a count of all mobile end-user devices active in said at least one cell.

10. The method of claim 7 or 9 further comprising the steps of:

identifying a direction of said at least one thoroughfare in which said bottleneck is present, said identification being based on a relative amount of current wireless traffic in at least two cells that are adjacent to said at least one cell.

11. A system for determining road traffic conditions in a geographic area corresponding to a plurality of radio coverage areas served by a wireless communications system including a plurality of base stations and a wireless switch coupled to the base stations, the system comprising:

a wireless traffic monitor, coupled to said wireless switch and which tracks a current flow of active mobile end-user devices entering and exiting at least one of a plurality of radio coverage areas which are served by the wireless communications system, and in which a plurality of roads are located;

a processor which compares said current flow for said at least one radio coverage area to a past average flow previously collected by said wireless communications system for said at least one radio coverage area under substantially similar time conditions; and means responsive to said comparison for assessing road traffic conditions in said at least one radio coverage area.

12. The system of claim 11 further comprising:

a voice information system for delivering to at least one user of said active mobile end-user devices a message indicative of a bottleneck condition in at least one section of at least one of said roads when said current flow for said at least one radio coverage area exceeds said past average flow for said at least one radio coverage area by a given percentage.

13. The system of claim 12 wherein said at least one section of said at least one of said roads is associated with at least one coverage area identified by a table contained in a storage area of said processor.

14. A system for estimating road conditions in a geographical area corresponding to a plurality of radio coverage areas served by a wireless communications network including a plurality of base stations and a wireless switch coupled to the base stations, said system comprising:

a wireless traffic monitor, coupled to said wireless switch, that keeps track of at least one of the following wireless activity data: a) currently active mobile end-user devices in at least one of a plurality of radio coverage areas of a wireless communications network, and b) amount of time spent by each currently active mobile end user-device in at least one of said coverage areas;

a processor that performs at least one of a plurality of functions which include a) comparing an expected average number of active mobile end-user devices in at least one of said radio coverage areas to a total tracked number of said currently active mobile end-user devices in said at least one of said radio coverage areas, and b) determining a total count of active mobile end-user devices in at least one of said radio coverage areas that spend a higher than expected amount of time in said at least one of said radio coverage areas; and means responsive to at least one of said functions for estimating traffic road conditions in thoroughfares located in said least one of said radio coverage areas.

15. The system of claim 14 further comprising:

a voice information system that delivers information associated with said estimated traffic road conditions to selected users of said active mobile end-user devices.

16. The invention of claim 14 further comprising:

a storage area that contains a table that correlates said radio coverage areas to particular sections of said thoroughfares so that traffic road conditions can be estimated for said particular sections of said thoroughfares.

17. The invention of claim 14 wherein said expected average number of active mobile end-user devices in each one of said radio coverage areas is based on past analog equivalent data previously collected by said wireless communications network.

18. The invention of claim 14 wherein said expected amount of time spent by a mobile end-user device in one of said radio coverage areas is based on past analog equivalent data previously collected by said wireless communications network.

19. A method of estimating traffic conditions in thoroughfares located in the radio coverage areas of a wireless communications network that includes a plurality of base stations and a wireless switch coupled to said base stations, said method comprising the steps of:

receiving, via at least one of the base stations and the wireless switch, communications signals from a plurality of wireless devices that are active in at least one of a plurality of radio coverage areas; and determining that a bottleneck traffic condition is present in at least one section of said thoroughfares when a count of said active devices located in said at least one of said radio coverage areas associated with said at least one section of said thoroughfares exceeds a selected threshold.

20. The method of claim 19 wherein information associated with said bottleneck traffic condition is delivered to at least one user of one of said active wireless devices.

* * * * *